(12) United States Patent
Jones, III

(10) Patent No.: US 11,207,930 B2
(45) Date of Patent: Dec. 28, 2021

(54) TIRE PRESSURE CONTROL SYSTEM

(71) Applicant: Lucius James Jones, III, Lancaster, NY (US)

(72) Inventor: Lucius James Jones, III, Lancaster, NY (US)

(*) Notice: Subject to any disclaimer, the term of this patent is extended or adjusted under 35 U.S.C. 154(b) by 421 days.

(21) Appl. No.: 16/172,275

(22) Filed: Oct. 26, 2018

(65) Prior Publication Data

US 2019/0135053 A1 May 9, 2019

Related U.S. Application Data

(60) Provisional application No. 62/583,454, filed on Nov. 8, 2017.

(51) Int. Cl.
*B60C 23/00* (2006.01)
*B60C 23/04* (2006.01)

(52) U.S. Cl.
CPC ...... *B60C 23/00336* (2020.05); *B60C 23/002* (2013.01); *B60C 23/004* (2013.01); *B60C 23/04* (2013.01); *B60C 23/0488* (2013.01); *B60C 23/0491* (2013.01); *B60C 23/0498* (2013.01)

(58) Field of Classification Search
CPC ............... B60C 23/002; B60C 23/003; B60C 23/00309; B60C 23/00336; B60C 23/0488; B60C 23/0491
See application file for complete search history.

(56) References Cited

U.S. PATENT DOCUMENTS

| | | | |
|---|---|---|---|
| 5,257,642 A | 11/1993 | Worth | |
| 5,261,471 A * | 11/1993 | Freigang | B60C 23/0496 152/415 |
| 5,954,084 A | 9/1999 | Conroy, Sr. | |
| 6,161,565 A | 12/2000 | Conroy, Sr. | |
| 7,690,411 B2 | 4/2010 | Wilson | |
| 7,992,610 B2 * | 8/2011 | Collet | B60C 23/003 152/417 |
| 8,255,117 B2 * | 8/2012 | Bujak | B60G 17/0195 701/37 |
| 9,566,833 B2 | 2/2017 | Swindell | |
| 10,471,783 B2 * | 11/2019 | Worth | B60C 23/10 |
| 10,549,585 B2 * | 2/2020 | Hinz | B60C 23/003 |

(Continued)

FOREIGN PATENT DOCUMENTS

KR 100766856 B1 * 10/2007 ......... B60C 23/0488

*Primary Examiner* — Kip T Kotter
*Assistant Examiner* — Emily G Castonguay
(74) *Attorney, Agent, or Firm* — Hodgson Russ LLP

(57) ABSTRACT

A tire pressure control system can include a pneumatic line with a first end in fluid communication with an interior of a tire and a pressure sensing device configured to acquire pressure data within the tire measured from the single pneumatic line. A motion sensing device can be configured to acquire motion data of the tire pressure control system. A microcontroller can receive the pressure data from the pressure sensing device and the motion data from the motion sensing device. A pneumatic solenoid in fluid communication with a second end of the single pneumatic line can be in an initial, closed position. The microcontroller can open the pneumatic solenoid and release fluid from the interior of the tire when the pressure data and motion data meet preset conditions.

20 Claims, 3 Drawing Sheets

(56) References Cited

U.S. PATENT DOCUMENTS

| | | | |
|---|---|---|---|
| 2006/0267569 A1* | 11/2006 | Biagiotti | G01N 17/04 324/71.1 |
| 2012/0221196 A1* | 8/2012 | Seymour | B60C 23/002 701/36 |
| 2018/0222259 A1* | 8/2018 | Janik | B60C 23/0486 |
| 2020/0031334 A1* | 1/2020 | Woodley | B60C 23/003 |

* cited by examiner

TIRE PRESSURE CONTROL SYSTEM

CROSS-REFERENCE TO RELATED APPLICATIONS

This application claims priority to U.S. Provisional Application No. 62/583,454, filed on Nov. 8, 2017, the disclosure of which is incorporated herein by reference in its entirety.

FIELD OF THE DISCLOSURE

The present disclosure relates to a pressure control system, and more particularly to a tire pressure control system for auto racing vehicles.

BACKGROUND OF THE DISCLOSURE

Auto racing is a sport that is becoming further dependent on technology more than it ever has in previous years. An area of auto racing vehicles that has not had many technological advances is in the control of tire pressure. Tire pressure is a critical measure that is used as an adjustment tool, and directly affects the handling and performance of an auto racing vehicle. During an auto racing event, a tire's pressure will progressively increase at an unknown rate from heat created due to friction. This variable increase of tire pressure can have adverse effects on the handling of the vehicle and can make it become unpredictable.

Presently, there are various mechanical approaches to prevent or reduce the rate of which the tire pressure increases. One approach to reduce the rate of increasing tire pressure is to use compressed nitrogen gas inside the tire instead of compressed air. Compressed nitrogen gas has a lower water content than compressed air, which during heat buildup will expand less than compressed air; thus reducing the amount that the tire pressure will increase.

A second approach is to predict how much the tire pressure will increase during an event and start the event at a lower tire pressure based on the anticipated increase. One drawback to this is that the increase in tire pressure is variable and not truly predictable. When starting at a lower pressure there is a high chance that the target end tire pressure will not be achieved. Both approaches mentioned above are an attempt to minimize the effects of increasing tire pressure during an event, but neither negate the increase of tire pressure.

One mechanical device that attempts to negate the tire pressure increase is a bleeder valve. A bleeder valve is typically a spring loaded valve that can be adjusted to open and relieve tire pressure at a desired set-point. These valves require constant maintenance to keep them operating properly and to avoid the valve getting stuck open, thus, in turn, causing a flat tire. Also due to the linear nature of a spring, the flow of air released through the valve to atmosphere is linear as well. When the tire pressure is slightly greater than the set-point of the mechanical bleeder valve, the valve may not open to vent to the atmosphere due to static friction between the valve seal and the housing. If the valve does open, the displacement of the valve will be minimal compared to a case where the tire pressure is much greater than the set-point of the valve, as more force on the spring will create a greater displacement of the valve. The latter case will allow a greater flow of air to atmosphere. This varying displacement of the valve can lead to inconsistent tire pressures as well.

A mechanical bleeder valve for the release of built-up heat inside a tire for auto racing vehicles is described by Worth in U.S. Pat. No. 5,257,642. Worth describes a bleeder valve comprising a body that houses a poppet under varying spring pressure, adjusted by a threaded cap. The adjustment of the threaded cap changes the spring pressure at which the unit allows tire pressure to be relieved to atmosphere. Cleaning the unit of debris and adjusting the threaded cap are both timely maintenance items that directly affect performance of the unit. Also, there are outside forces during operation that affect performance such as: spring deformation due to centripetal force, spring deformation due to heat, sudden release due to shock, and increased static friction on the poppet; all of which can adversely affect the spring pressure adjustment. These adverse effects on the spring pressure lead to instability and inconsistency during use, effectively changing the user's set-point during operation.

Similar to Worth, Conroy describes a mechanical bleeder valve as well in U.S. Pat. No. 5,954,084. This unit also utilizes a poppet and varying spring pressure configuration to allow pressure to be relieved. Unlike Worth, the unit is located coaxially with the tire to eliminate centripetal force on the adjustment spring during operation. While centripetal force is removed with this design, the other outside forces mentioned above are still present and have adverse effects on the unit's spring pressure. Also in the same manner as Worth's, this unit requires timely maintenance as well, leaving the same opportunity for poor performance during use.

A device described by Wilson in U.S. Pat. No. 7,690,411, is an electronically controlled mechanical valve to maintain tire pressure. Wilson's device has the ability to both increase and decrease tire pressure through one mechanically operated valve. The supply for increasing tire pressure is one of a fixed volume pressurized tank, mounted to the axle. Auto racing vehicles are subject to violent crashes often, and having a pressurized tank in the axle of an auto racing vehicle leaves for the possibility of the pressurized tank exploding; thus making the tank safety hazard. This device is also fixed to a single tire and wheel assembly, which can be costly as auto racing team carry upwards of eight tire and wheel assemblies while at a racing event.

A device that corrects some of the issues of the mechanical and electronically controlled variants is outlined by Swindell in U.S. Pat. No. 9,566,833. This device utilizes a digital pressure switch in conjunction with an electronic solenoid valve to monitor and relieve tire pressure to atmosphere. When the device is on, the digital pressure switch is continuously monitoring the tire pressure from one connection to the tire. When the tire pressure is above the set-point, tire pressure is relieved to atmosphere on a second connection to the tire. These two connections to the tire are required so the digital pressure switch does not read a drop in pressure while the electronic solenoid is relieving to atmosphere; which would result in incorrect tire pressure readings. A downfall of continuously monitoring and relieving tire pressure is that a shock event, such as the vehicle's tire hitting a divot or varying terrain, will register as increased tire pressure, leading the device to relieve to atmosphere. Said shock event is not a tire pressure increase from heat buildup, rather a false reading due to the operating environment.

Therefore, there is a need for an electronic tire pressure control device that is easily maintained, easily adjusted to the desired set-point, and has the ability to compensate for the operating environment. It is desirable for such a device to be composed of minimal components with minimal connections to the outside environment to limit the possibilities of failure. Further such a device needed would have a lower cost to implement across multiple tire and wheel assemblies and easily adapt to various forms of auto racing vehicles.

SUMMARY OF THE DISCLOSURE

The tire pressure control system includes a tire mounted on a wheel, mounted to an axle of a vehicle, such as an auto racing vehicle. A pneumatic solenoid and pressure sensing device are in fluid communication with the tire and wheel assembly via a single pneumatic line. A main control board is powered by a rechargeable battery, and the main control board's power is enabled by an on-board power switch. The pressure sensing device is part of the main control board. The main control board uses a microcontroller to collect information from the pressure sensing device and a motion sensing device. The microcontroller stores operating parameters that are received over a data connection. The operating parameters are then compared to the information from the pressure sensing device and motion sensing device. The result of the comparison between the information and the operating parameters determine if the main control board is to power the pneumatic solenoid, thus relieving tire pressure to atmosphere. If the operating parameters are not met, the pneumatic solenoid does not relieve to atmosphere and information is collected again from the pressure sensing device and a motion sensing device.

The housing containing the pneumatic solenoid, main control board, and rechargeable battery has an interchangeable mounting interface. The housing can accept various interchangeable mounting interfaces, allowing for mounting to different auto racing vehicle axles. This interchangeable mounting interface allows for the easy removal of the pressure control system from the auto racing vehicle's axle.

DESCRIPTION OF THE DRAWINGS

For a fuller understanding of the nature and objects of the present disclosure, reference should be made to the following detailed description taken in conjunction with the accompanying drawings, in which.

LIST OF REFERENCE NUMERALS

Figure 1:
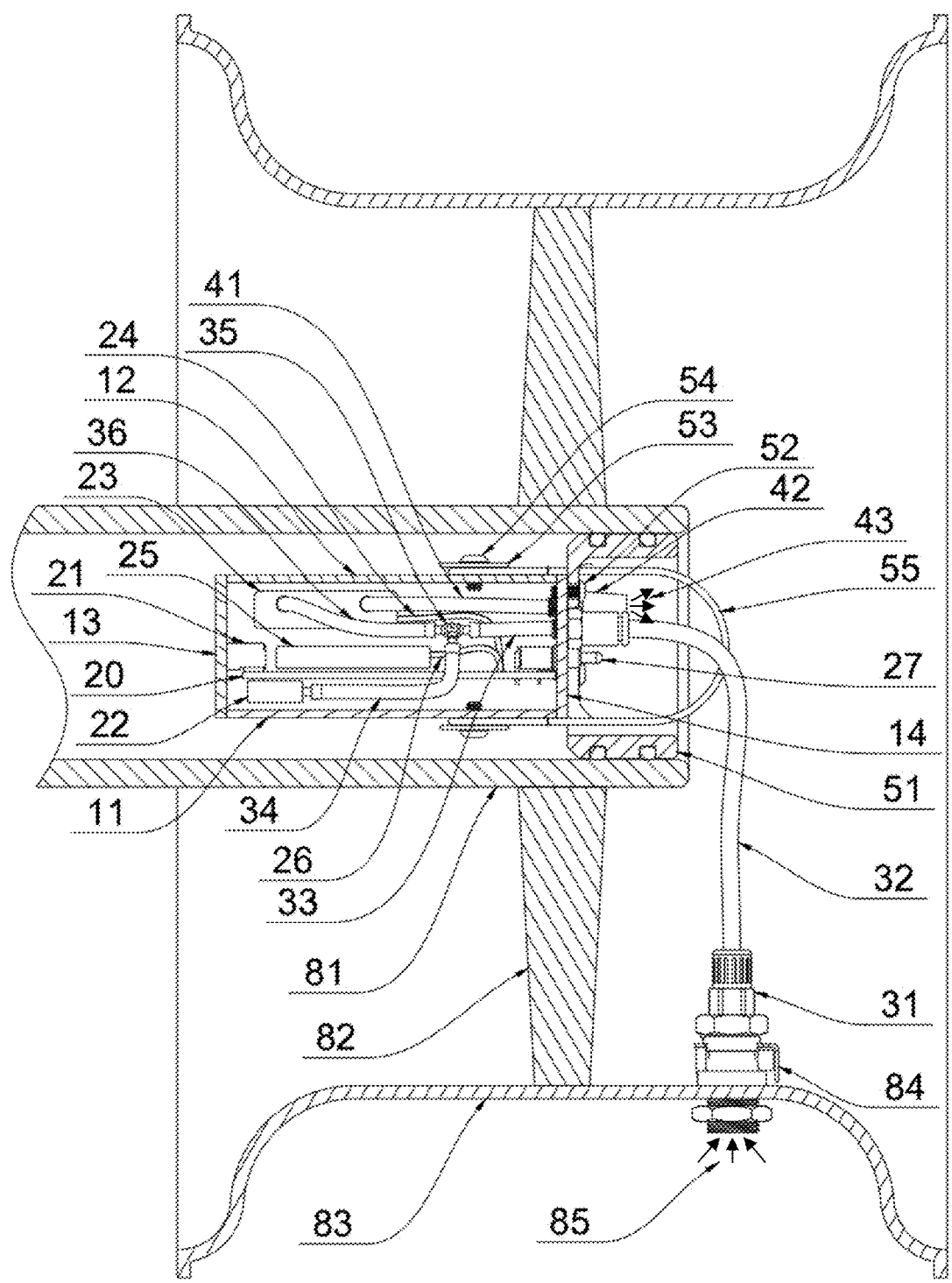
FIG. 1 is a cross sectional view of a wheel and tire assembly of an auto racing vehicle outfitted with a tire pressure control system of the present disclosure.

Tire pressure control system 1
Lower housing 11
Upper housing 12
Rear housing 13
Front housing 14
Control board 20
Data connection 21
Pressure sensing device 22
Pneumatic solenoid 23
Wired connection to pneumatic solenoid 24
Rechargeable battery 25
Wired connection to rechargeable battery 26
Power switch 27
Motion sensing device 28
Microcontroller 29
Male quick disconnect 31
First pneumatic tube 32
Second pneumatic tube 33
Third pneumatic tube 34
Tee connection 35
Fourth pneumatic tube 36
Fifth pneumatic tube 41
Vent 42
Atmosphere 43
Interchangeable mounting interface 51
Mounting screws 52
Washers 53
Screws 54
Tether 55
O-ring 56
Axle 81
Wheel hub 82
Tire and wheel assembly 83
Female quick disconnect 84
Tire 85
Remote programmer 90

DETAILED DESCRIPTION

FIG. 1 shows a particular embodiment of the tire pressure control system 1 installed into the inner bore of an axle 81, which is connected to wheel hub 82 and tire and wheel assembly 83 of an auto racing vehicle. A female quick disconnect 84 may be provided on the tire and wheel assembly 83. The tire pressure control system 1 may include a male quick disconnect 31, which may mate with the female quick disconnect 84. The tire pressure control system 1 may further include a first pneumatic tube 32 in fluid communication with the male quick disconnect 31, and a second pneumatic tube 33 in fluid communication with the first pneumatic tube 32. The tire pressure control system 1 may further include a tee connection 35 in fluid communication with the second pneumatic tube 33, a third pneumatic tube 34, and a fourth pneumatic tube 36. The tire pressure control system 1 may further include a pressure sensing device 22. Air from the tire 85 may flow freely into the tire pressure control system 1, via the male quick disconnect 31, first pneumatic tube 32, second pneumatic tube 33, tee connection 35, and third pneumatic tube 34, to the pressure sensing device 22. The pressure sensing device 22 may measure the pressure of the air from the tire 85.

The tire pressure control system 1 may further include a pneumatic solenoid 23 in fluid communication with the fourth pneumatic tube 36. The pneumatic solenoid 23 may be normally closed. The tire pressure control system 1 may further include a fifth pneumatic tube 41 in fluid communication with the pneumatic solenoid 23, and a vent 42 in fluid communication with the fifth pneumatic tube 41. The vent 42 may allow air to be released to the atmosphere 43 when the pneumatic solenoid 23 is open.

Figure 4:
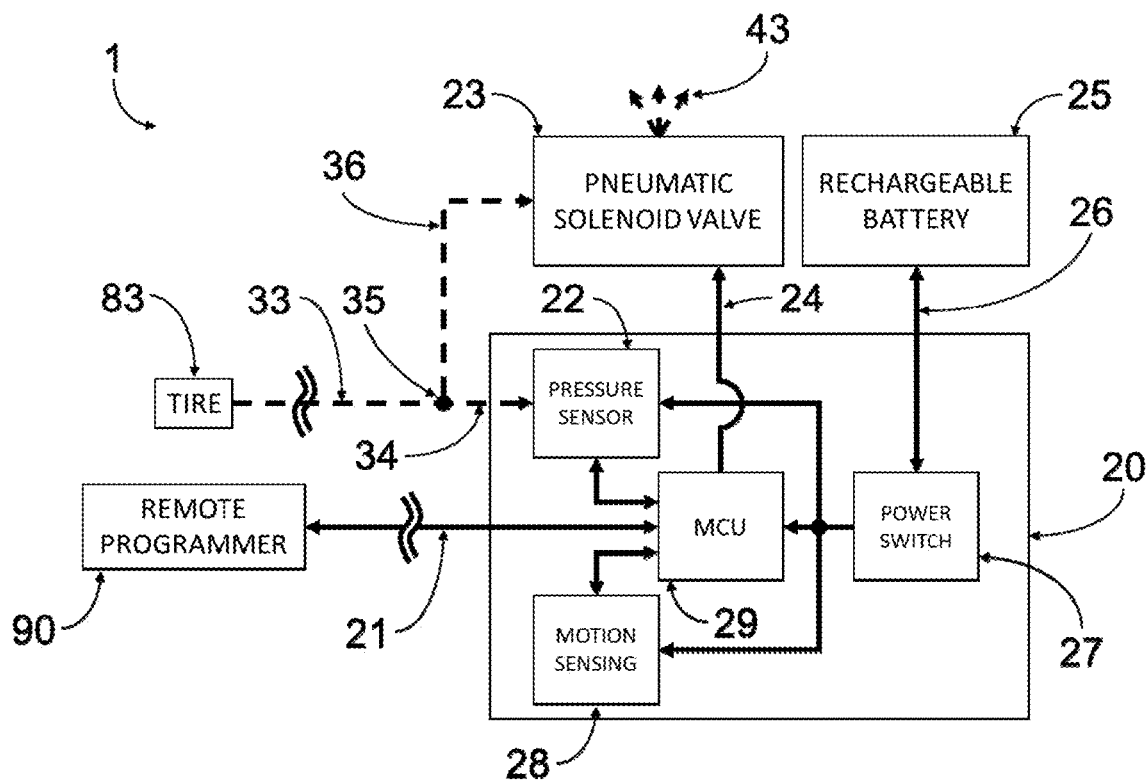
FIG. 4 is a functional block diagram of a tire pressure control system of the present disclosure.

Referencing FIG. 4 for a qualitative representation of a tire pressure control system 1, the tire pressure control system 1 may further include a control board 20. The pressure sensing device 22 may be mounted on the control board 20. A microcontroller 29 and a motion sensing device 28 may further be mounted on the control board 20. The microcontroller 29 may be configured to receive the pressure readings from the pressure sensing device 22 and information from the motion sensing device 28. The motion sensing device 28 may sense absolute or incremental motion of the auto racing vehicle. For example, the motion sensing device 28 may sense if the vehicle is moving or not or at what speed the vehicle is moving. The motion sensing device 22 may be an accelerometer or a global positioning system. Preset conditions may be provided to the microcontroller 29 using a remote programmer 90, which is connected to the microcontroller 29 using a data connection 21. The preset conditions can be made up of any combination of the following: an upper limit of allowable tire pressure, an allowable operating range of tire pressure, the velocity the vehicle is moving, or if the vehicle is in any motion. The data connection 21 may include USB, Wi-Fi, or Bluetooth connections, or any other suitable medium of wired or wireless communication. The remote programmer 90 may be a phone application, computer application, or standalone handheld unit. When the information received by the microcontroller 29 from the pressure sensing device 22 and the motion sensing device 28 meets the preset conditions, the microcontroller 29 will open the pneumatic solenoid 23 via a wired connection 24. The pneumatic solenoid 23 will remain open until the preset conditions of the microcontroller 29 are no longer met. In one specific example, the preset conditions on the microcontroller 29 can be 10 psi and 29.4 m/s$^2$, wherein if the data from the pressure sensing device 22 is greater than 10 psi and the data from the motion sensing device is greater than 29.4 m/s$^2$, the microcontroller 29 will open the pneumatic solenoid 23.

The tire pressure control system 1 may include a rechargeable battery 25, connected to the control board 20 via a power connection 26, and a power switch 27.

Figure 2:
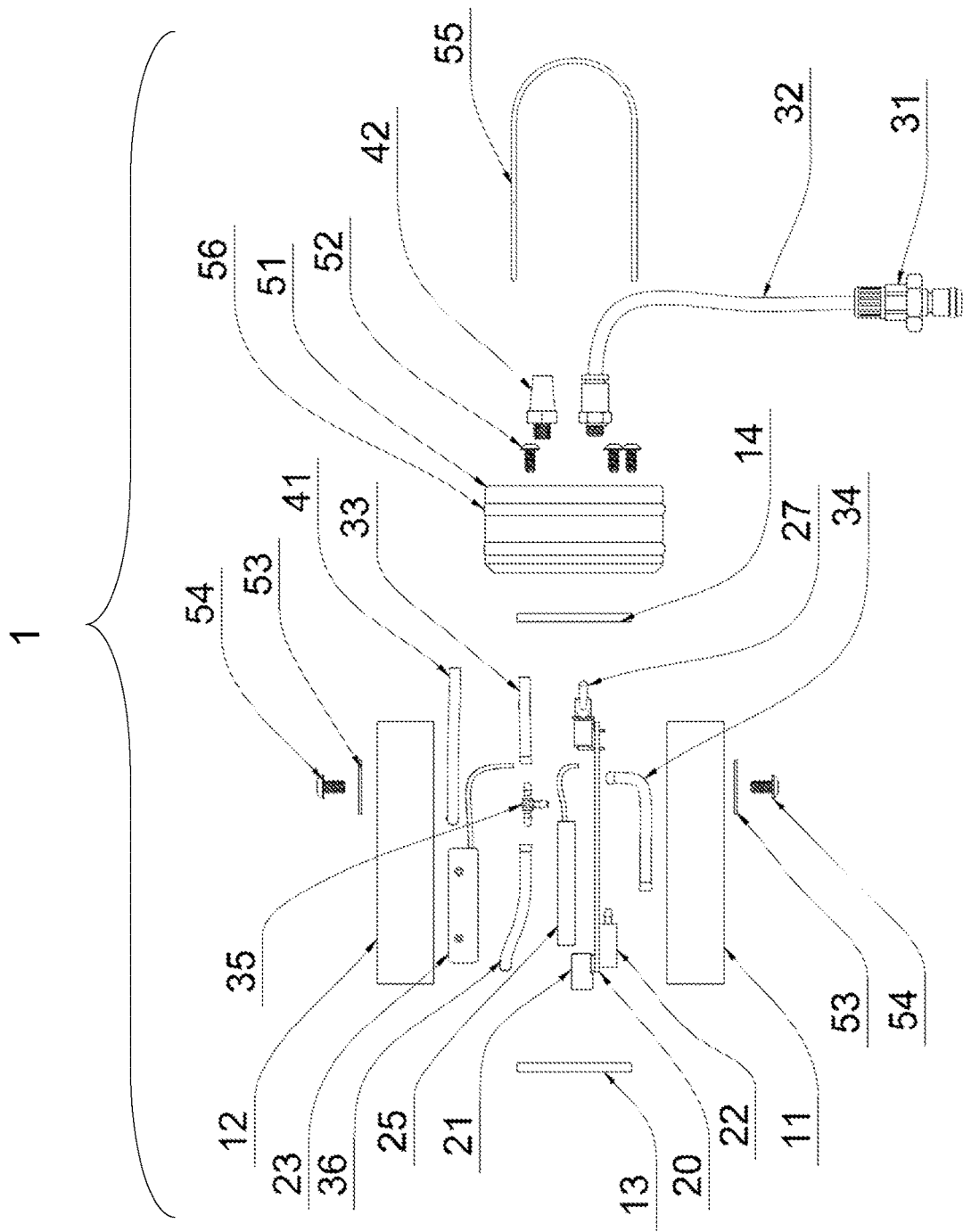
FIG. 2 is an exploded view of a tire pressure control system of the present disclosure.

FIG. 2 shows an exploded view of the tire pressure control system 1. The tire pressure control system 1 may comprise an upper housing 12 and a lower housing 11, fastened to a front housing 14 and a rear housing 13. The first pneumatic tube 32, the vent 42, and the power switch 27, each extend out of the front housing 14. All other components may be protected and contained within the housing portions 11, 12, 13, 14. The upper housing 12 and lower housing 11 are split to allow for assembly, and are identical units to minimize the unique components of the tire pressure control system 1. All housing portions 11, 12, 13, 14 may be made from a rigid material, like aluminum, to survive in the harsh auto racing environment.

Figure 3:
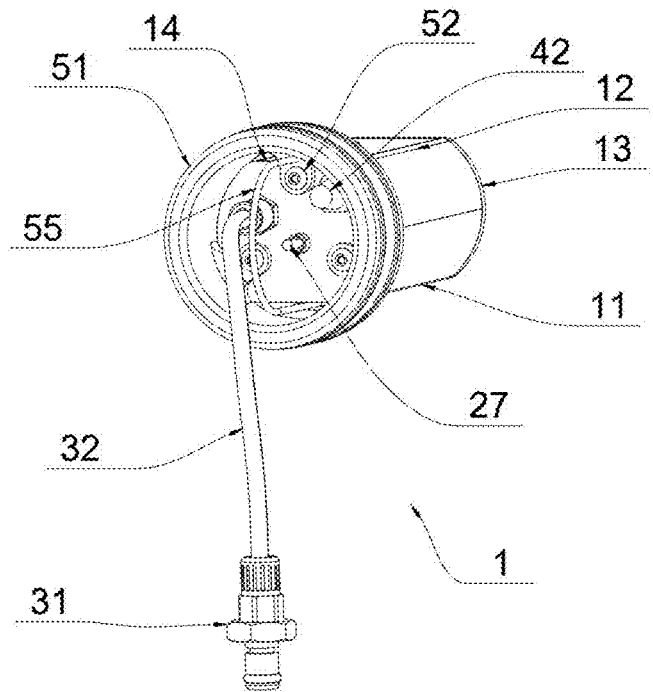
FIG. 3 is a perspective view of a tire pressure control system of the present disclosure.

FIG. 3 shows a front facing perspective view of the tire pressure control system 1. The tire pressure control system 1 may further include an interchangeable mounting interface 51 mounted to the front housing 14 by three mounting screws 52. The interchangeable mounting interface 51 allows for all components of the tire pressure control system 1 to be reused with a different variation of the interchangeable mounting interface 51. The variation of the interchangeable mounting interface 51 may be different: geometry, attachment configurations, or outside diameter to be accepted in a different diameter inner axle bore 81. As shown in FIG. 2, the interchangeable mounting interface 51 may include o-rings 56, which provide a friction fit between the outside diameter of the interchangeable mounting interface 51 and the inner axle bore 81. The tire pressure control system 1 may further include a tether 55 mounted to the upper housing 12 and lower housing 11 via a pair of washers 53 and screws 54. The tether 55 may be pulled to assist removal of the system 1 from the axle 81.

The tire pressure control system 1 has minimal connections to the outside environment by utilizing one attachment to a tire and wheel assembly 83 via male quick disconnect 31. Variations of the interchangeable mounting interface 51 allow for the tire pressure control system 1 to be easily adapted to different auto racing vehicles. The data connection 21 from remote programmer 90 simplifies transferring the preset conditions to the control board 20. The control board 20 uses a pressure sensing device 22 and motion sensing device 28 to compensate for the operating environment.

Although the present disclosure has been described with respect to one or more particular embodiments, it will be understood that other embodiments of the present disclosure may be made without departing from the spirit and scope of the present disclosure.

What is claimed is:

1. A tire pressure control system comprising:
   a single pneumatic line with a first end in fluid communication with an interior of a tire;
   a pressure sensing device configured to acquire pressure data within the tire measured from the single pneumatic line;
   a motion sensing device configured to acquire motion data of the tire pressure control system;
   a microcontroller configured to receive the pressure data from the pressure sensing device and the motion data from the motion sensing device; and
   a pneumatic solenoid in fluid communication with a second end of the single pneumatic line, the pneumatic solenoid being in an initial, closed position;
   wherein the microcontroller is configured to open the pneumatic solenoid and release fluid from the interior of the tire when the pressure data and the motion data meet preset conditions; and
   wherein the tire pressure control system is disposed within an axle.

2. The tire pressure control system according to claim 1, wherein the microcontroller receives the preset conditions from an external device over a data connection means.

3. The tire pressure control system according to claim 2, wherein the data connection means is a wired connection.

4. The tire pressure control system according to claim 2, wherein the data connection means is a wireless connection.

5. The tire pressure control system according to claim 1, wherein the motion sensing device is an accelerometer.

6. The tire pressure control system according to claim 1, wherein the motion sensing device is a global positioning system.

7. The tire pressure control system according to claim 1, further comprising:
   a housing enclosing the pressure sensing device, the motion sensing device, the microcontroller, and the pneumatic solenoid; and
   an interchangeable mounting interface connected to the housing, and configured to secure the tire pressure control system within the axle.

8. The tire pressure control system according to claim 7, wherein the interchangeable mounting interface connects to the housing through a bolted connection.

9. The tire pressure control system according to claim 7, where in the interchangeable mounting interface uses O-rings to secure to the axle.

10. The tire pressure control system according to claim 7, further comprising a removable tether connected to the housing for removal of the tire pressure control system from within the axle.

11. A vehicle comprising:
    an axle;
    a wheel mounted to the axle;
    a tire mounted on the wheel; and
    a tire pressure control system, including:

a single pneumatic line with a first end in fluid communication with an interior of the tire;
a pressure sensing device configured to acquire pressure data within the tire measured from the single pneumatic line;
a motion sensing device configured to acquire motion data of the tire pressure control system;
a microcontroller configured to receive the pressure data from the pressure sensing device and the motion data from the motion sensing device; and
a pneumatic solenoid in fluid communication with a second end of the single pneumatic line and is normally closed;
wherein the microcontroller is configured to open the pneumatic solenoid and release fluid from the interior of the tire when the pressure data and the motion data meet preset conditions; and
wherein the tire pressure control system is disposed within the axle.

12. The vehicle of claim 11, wherein the microcontroller receives the preset conditions from an external device over a data connection means.

13. The vehicle of claim 12, wherein the data connection means is a wired connection.

14. The vehicle of claim 12, wherein the data connection means is a wireless connection.

15. The vehicle of claim 11, wherein the motion sensing device is an accelerometer.

16. The vehicle of claim 11, wherein the motion sensing device is a global positioning system.

17. The vehicle of claim 11, further comprising:
a housing enclosing the pressure sensing device, the motion sensing device, the microcontroller, and the pneumatic solenoid; and
an interchangeable mounting interface connected to the housing, and configured to secure the tire pressure control system within the axle.

18. The vehicle of claim 17, wherein the interchangeable mounting interface connects to the housing through a bolted connection.

19. The vehicle of claim 17, where in the interchangeable mounting interface uses O-rings to secure to the axle.

20. The vehicle of claim 17, further comprising a removable tether connected to the housing for removal of the tire pressure control system from within the axle.

* * * * *